(12) United States Patent
Orf et al.

(10) Patent No.: US 10,527,220 B2
(45) Date of Patent: Jan. 7, 2020

(54) PNEUMATIC FOOT-OPERATED MONOPOD

(71) Applicant: The Tiffen Company, LLC, Hauppauge, NY (US)

(72) Inventors: Hans Robert Orf, Simi Valley, CA (US); Francis Kenny, Santa Monica, CA (US); Jarred Land, Los Angeles, CA (US)

(73) Assignee: The TIFFEN COMPANY LLC, Hauppauge, NY (US)

( * ) Notice: Subject to any disclaimer, the term of this patent is extended or adjusted under 35 U.S.C. 154(b) by 0 days.

(21) Appl. No.: 15/935,234

(22) Filed: Mar. 26, 2018

(65) Prior Publication Data

US 2018/0274719 A1    Sep. 27, 2018

Related U.S. Application Data

(60) Provisional application No. 62/477,072, filed on Mar. 27, 2017.

(51) Int. Cl.

| | |
|---|---|
| F16M 11/28 | (2006.01) |
| G03B 17/56 | (2006.01) |
| F16M 13/04 | (2006.01) |
| F15B 15/14 | (2006.01) |
| F16H 25/18 | (2006.01) |
| F15B 15/02 | (2006.01) |
| F16M 11/18 | (2006.01) |
| F16M 11/20 | (2006.01) |
| F16M 13/00 | (2006.01) |

(52) U.S. Cl.
CPC ............ *F16M 11/28* (2013.01); *F15B 15/02* (2013.01); *F15B 15/14* (2013.01); *F16H 25/18* (2013.01); *F16M 11/18* (2013.01); *F16M 11/2078* (2013.01); *F16M 13/00* (2013.01); *F16M 13/04* (2013.01); *G03B 17/561* (2013.01); *F16M 2200/025* (2013.01)

(58) Field of Classification Search
None
See application file for complete search history.

(56) References Cited

U.S. PATENT DOCUMENTS

| 3,712,640 A | * | 1/1973 | Shipman | .................. B62H 1/02 |
| | | | | 280/301 |
| 4,697,773 A | * | 10/1987 | Jaumann | .................. F16F 9/36 |
| | | | | 248/162.1 |
| 6,437,225 B1 | * | 8/2002 | Shigenaga | ........... G10D 13/065 |
| | | | | 84/422.1 |

(Continued)

*Primary Examiner* — Clayton E. LaBalle
*Assistant Examiner* — Linda B Smith
(74) *Attorney, Agent, or Firm* — Kirschstein et al.

(57) ABSTRACT

A monopod includes an elongated housing and a pneumatic actuator having a cylinder bounding a compartment in which a pressurized fluid and/or gas is contained, and an elongated piston having a piston head mounted in the compartment and a piston rod movable along a longitudinal axis through an upper open end of the housing when the pressurized fluid is released. A support for a portable device, such as a camera, is mounted on the piston rod exteriorly of the housing. A foot-operated control is mounted on the housing adjacent its base. The control is movable by pressure exerted by a user's foot to a control position in which the pressurized fluid and/or gas is released to jointly move the piston rod and the support to an adjustable elevation relative to the base.

13 Claims, 19 Drawing Sheets

(56) References Cited

U.S. PATENT DOCUMENTS

| | | | | |
|---|---|---|---|---|
| 7,244,070 | B2* | 7/2007 | Burnett | G03B 17/00 |
| | | | | 248/118 |
| 7,246,783 | B2* | 7/2007 | Harold | A45B 25/00 |
| | | | | 135/16 |
| 8,632,045 | B2* | 1/2014 | Ma | A45B 23/00 |
| | | | | 135/16 |
| 9,416,545 | B1* | 8/2016 | Nelson | E04F 11/1812 |
| 9,883,978 | B2* | 2/2018 | Blankenship | A61G 5/10 |
| 10,065,668 | B2* | 9/2018 | Runzel | B62B 3/005 |
| 2002/0134674 | A1* | 9/2002 | Andrews | A61L 2/183 |
| | | | | 204/242 |
| 2003/0102627 | A1* | 6/2003 | Shinn | A47B 9/00 |
| | | | | 273/309 |
| 2015/0003820 | A1* | 1/2015 | Li | G03B 17/561 |
| | | | | 396/428 |
| 2016/0192780 | A1* | 7/2016 | Sinclair | A47C 4/04 |
| | | | | 297/183.5 |

* cited by examiner

PNEUMATIC FOOT-OPERATED MONOPOD

FIELD OF THE DISCLOSURE

The present disclosure relates generally to a lightweight, portable, and compact, pneumatic monopod or unipod, for use in supporting portable devices, such as stand-alone, still or video, portable cameras; built-in cameras in portable smartphones, tablets, or computers; optical and/or imaging and/or precision devices, e.g., binoculars, compasses, transits, and the like; firearms or like weapons; or any other portable device that would require hands-free raising or lowering to an adjusted elevation or height at which the portable device is desired to be supported in a stationary manner.

BACKGROUND

In one advantageous use, a monopod stationarily supports and allows a portable camera to be held steadier than, for example, in a photographer's hands, allowing the photographer to take sharp, clear pictures at slower shutter speeds, and/or with longer focal length lenses, and also reduces camera hand shake and small random hand movements. Monopods are easier to transport and quicker to set up than conventional tripods for supporting cameras, making the monopods preferable for action shots and on-the-go (OTG) photography. Camera height adjustment is typically performed by having the photographer manually unlock, and manually extend and/or retract, one or more telescoping sections of the monopod linearly lengthwise of the monopod to a desired camera elevation or height, and then manually locking the extended/retracted section(s) at the desired camera height. In many cases, however, one or both of the photographer's hands are already occupied with holding the camera and/or lenses and/or filters and/or like optical/imaging accessories. As a consequence, the photographer may not always have a hand free to manually and quickly extend and/or retract the monopod, especially when a rapid picture setup and action shots are desired.

Accordingly, it would be desirable to enable a monopod to be more readily, rapidly, and conveniently extended and/or retracted to a desired camera height to promote its use, especially by a photographer even when one or both of the photographer's hands are already occupied.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
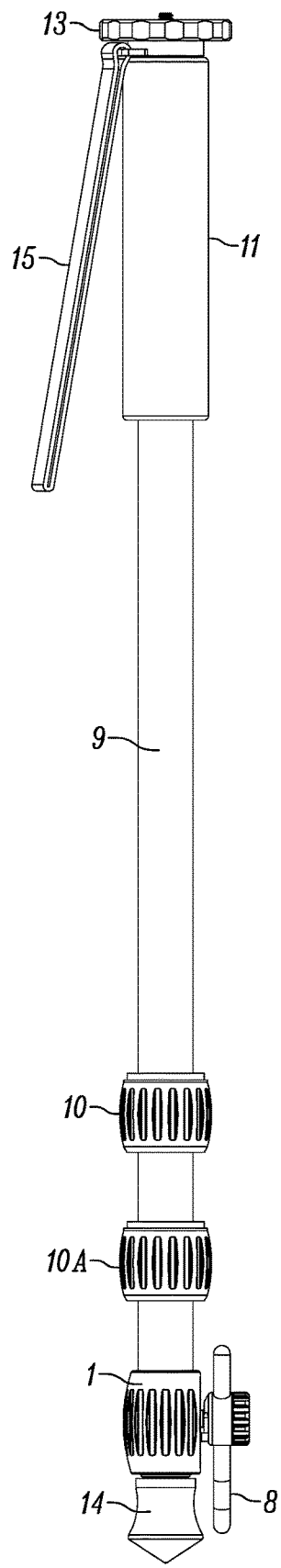
FIG. 1 is a side elevational view of a monopod in accordance with this disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The monopod and its components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

In accordance with one feature of this invention, a monopod supports a portable device, such as a camera, at an adjusted height or elevation in a stationary manner. The monopod includes an elongated housing extending lengthwise along a longitudinal axis between an upper open end and a lower base for engaging a support surface in use, and a pneumatic actuator mounted in the housing. The actuator is preferably a fluid and/or gas spring and includes a cylinder bounding a compartment in which a pressurized fluid and/or gas is contained, and an elongated piston having a piston head mounted in the compartment and a piston rod movable along the longitudinal axis through the upper open end of the housing when the pressurized fluid and/or gas is released. The monopod also includes a support or head for the camera mounted on the piston rod exteriorly of the housing, and a foot-operated control or foot pedal mounted on the housing adjacent the base. The foot-operated control is movable by pressure exerted by a user's foot, or other means, to a control or actuated position in which the pressurized fluid and/or gas is released to jointly move the piston rod and the support to an adjustable elevation, e.g., camera height, relative to the base and the support surface. Thus, even when one or both of the user's hands are already occupied with holding the camera and/or lenses and/or filters and/or like optical/imaging accessories, the camera height adjustment can still be readily, conveniently and rapidly performed in a hands-free manner by pressure exertion with the user's foot on the foot pedal. Once pressure on the foot pedal is removed, the actuator locks the piston rod and the support at the adjusted elevation, thereby maintaining the desired camera height.

Figure 2:
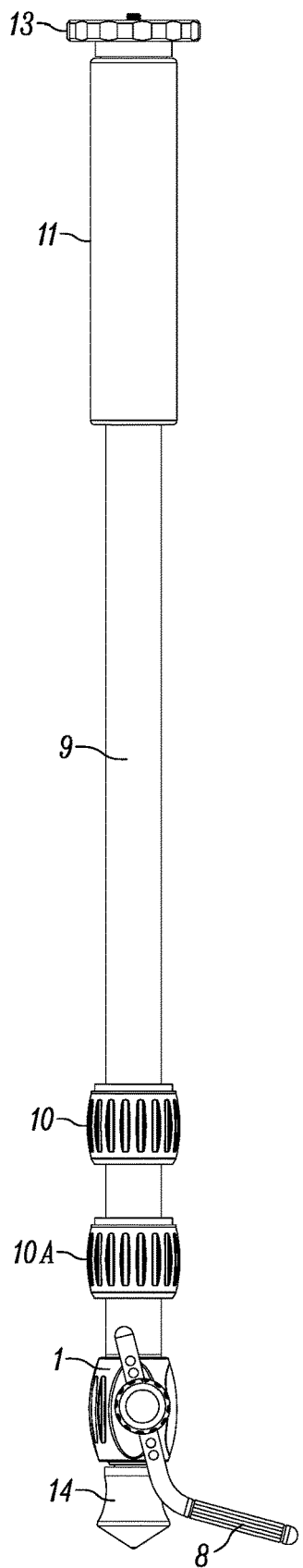
FIG. 2 is a front elevational view of the monopod.
Figure 3:
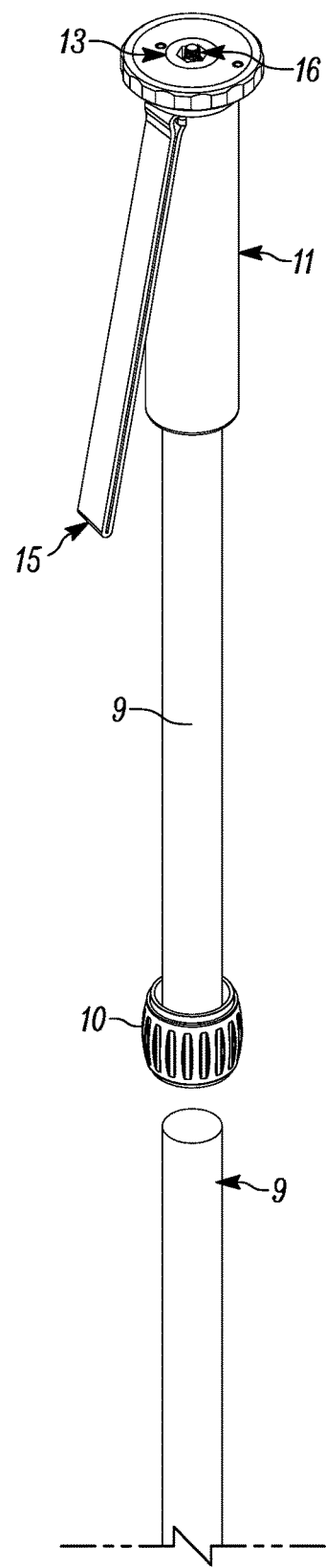
FIG. 3 is a broken-away, perspective, exploded view of a top of the monopod.

In the drawings, the following reference numerals have been used to generally identify a monopod that includes the following components:

1. Monopod Base
2. Monopod Base Cover
3. Pivot Bushing
4. Cam
5. Pedal Pivot Shaft Member
6. Pedal Locking Knob
7. Wear pin for Pedal Locking
8. Foot Pedal; 8A Slot
9. Monopod tube(s)
10. Monopod Tube Clamp; 10A Guide Tube
11. Monopod Hand Grip
12. Mounting Indents
13. Camera Support Plate.
14. Monopod Foot
15. Wrist Strap
16. Camera Mounting Screw
17. Spike
18. Lower Gas Spring Retaining insert
19. Locking Surface
20. Cam Locking Pin or Screw
21. Limit Pin
22. Limit Pin Adjusting screw
23. Fluid and/or Gas Spring Outer Casing
24. Fluid and/or Gas Spring Inner Rod and Release Pin
25. Cover mounting Screws
26. Rubber Knob Friction Ring
27. Rubber Bumper
28. Lock Pin or Limit Stop
29. Spring
30. Friction Washer
31. Gas Spring Adjustment Lock Screw
32. Foot Pad
33. Swivel
34. Monopod Foot Thus, FIGS. 1-3 illustrate an elongated outer tube 9 having, at its upper end, a hand grip 11, a camera support plate or head 13, a camera mounting screw 16, and a wrist strap 15, and, at its lower end, a base 1, a foot 14, and a foot pedal 8. One or more inner, telescoping tubes may be located inside the outer tube 9. A plurality of rotatable tube clamps 10 enable the tubes to be selectively locked together when turned in one circumferential direction, and selectively unlocked when turned in the opposite circumferential direction. A guide tube 10A is employed to guide the telescoping tubes during their movement.

Figure 4:
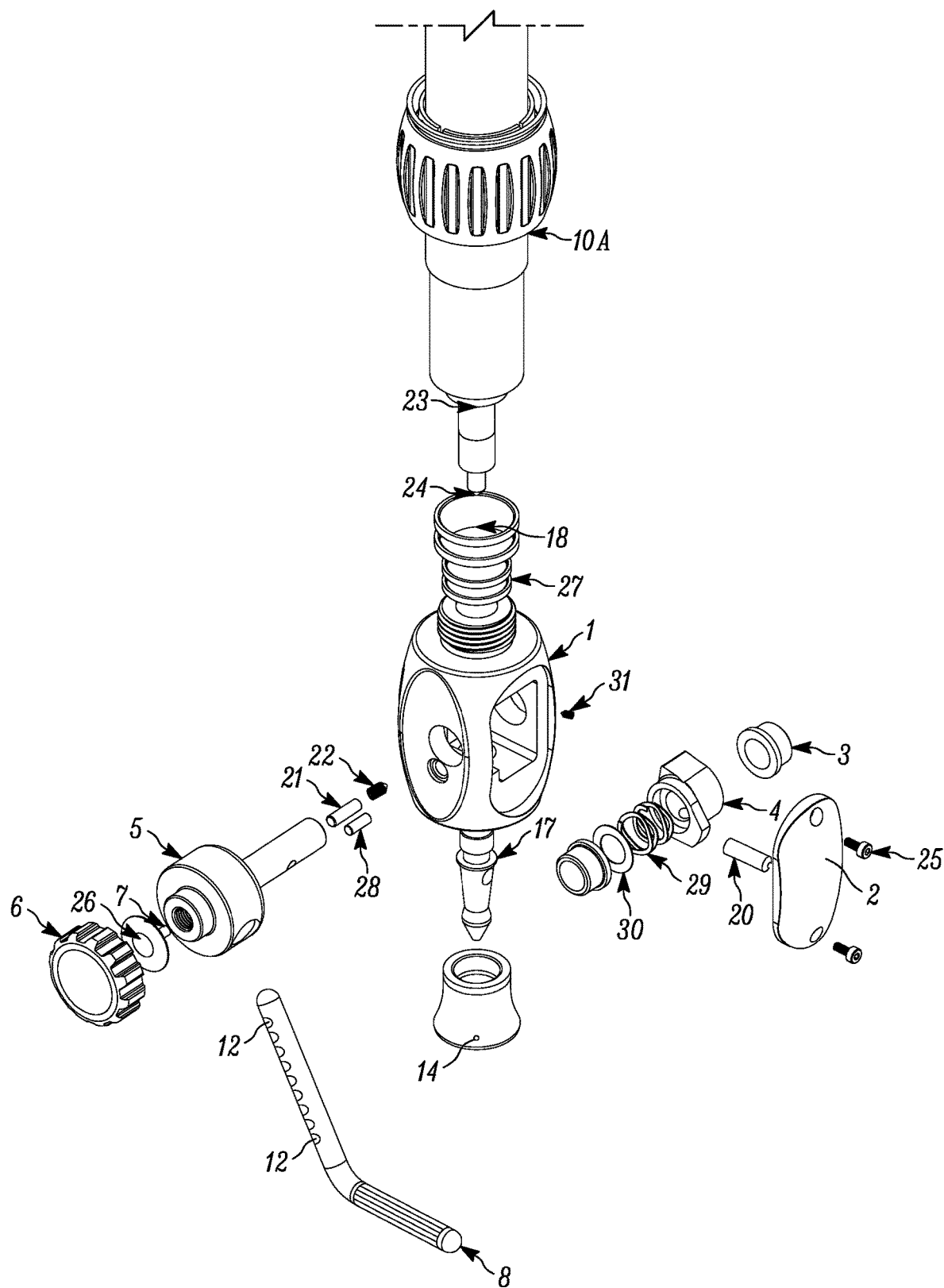
FIG. 4 is a broken-away, perspective, exploded view of a bottom of the monopod.
Figure 5:
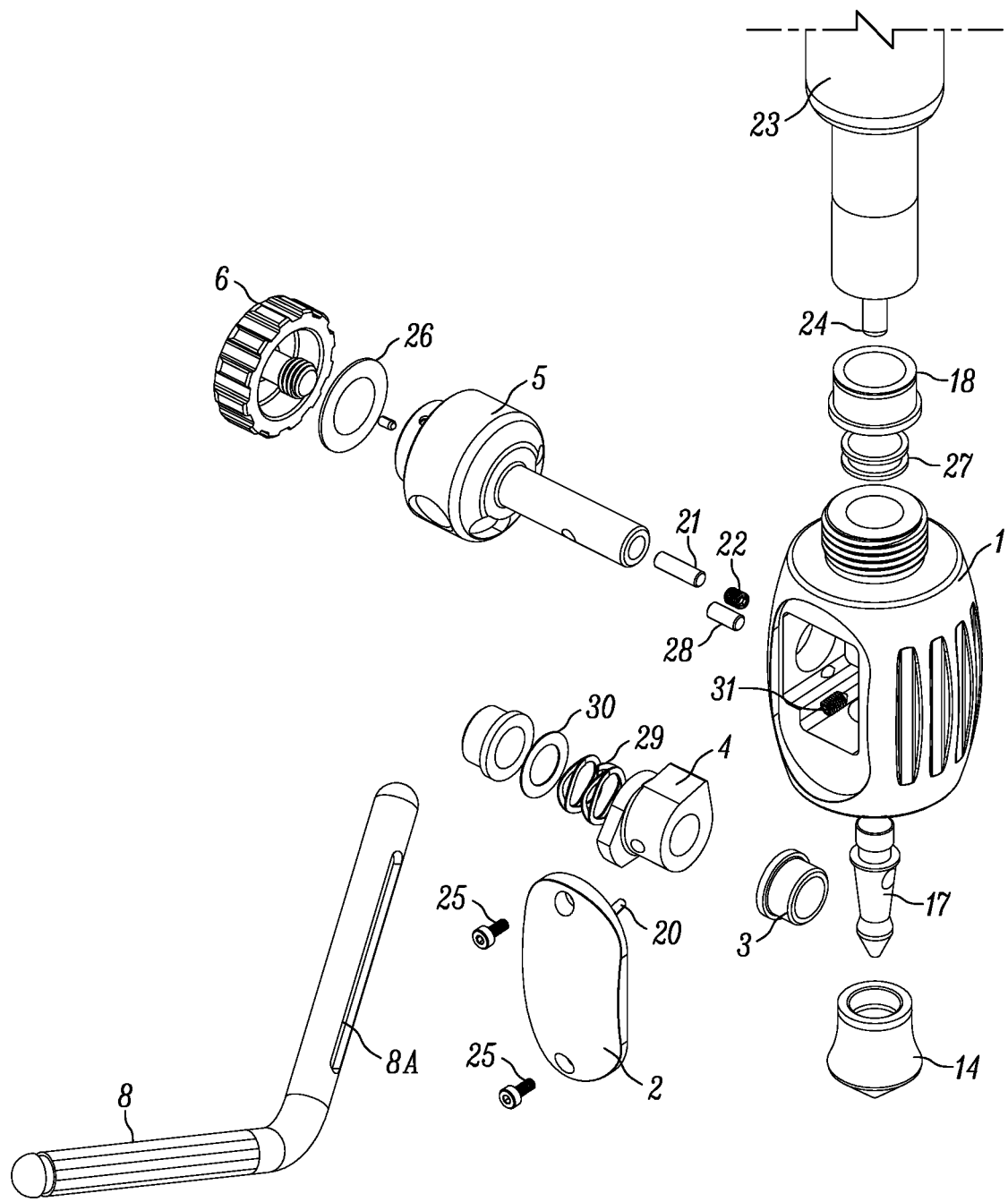
FIG. 5 is a broken-away, perspective, exploded view of the bottom of the monopod on an enlarged scale.
Figure 6:
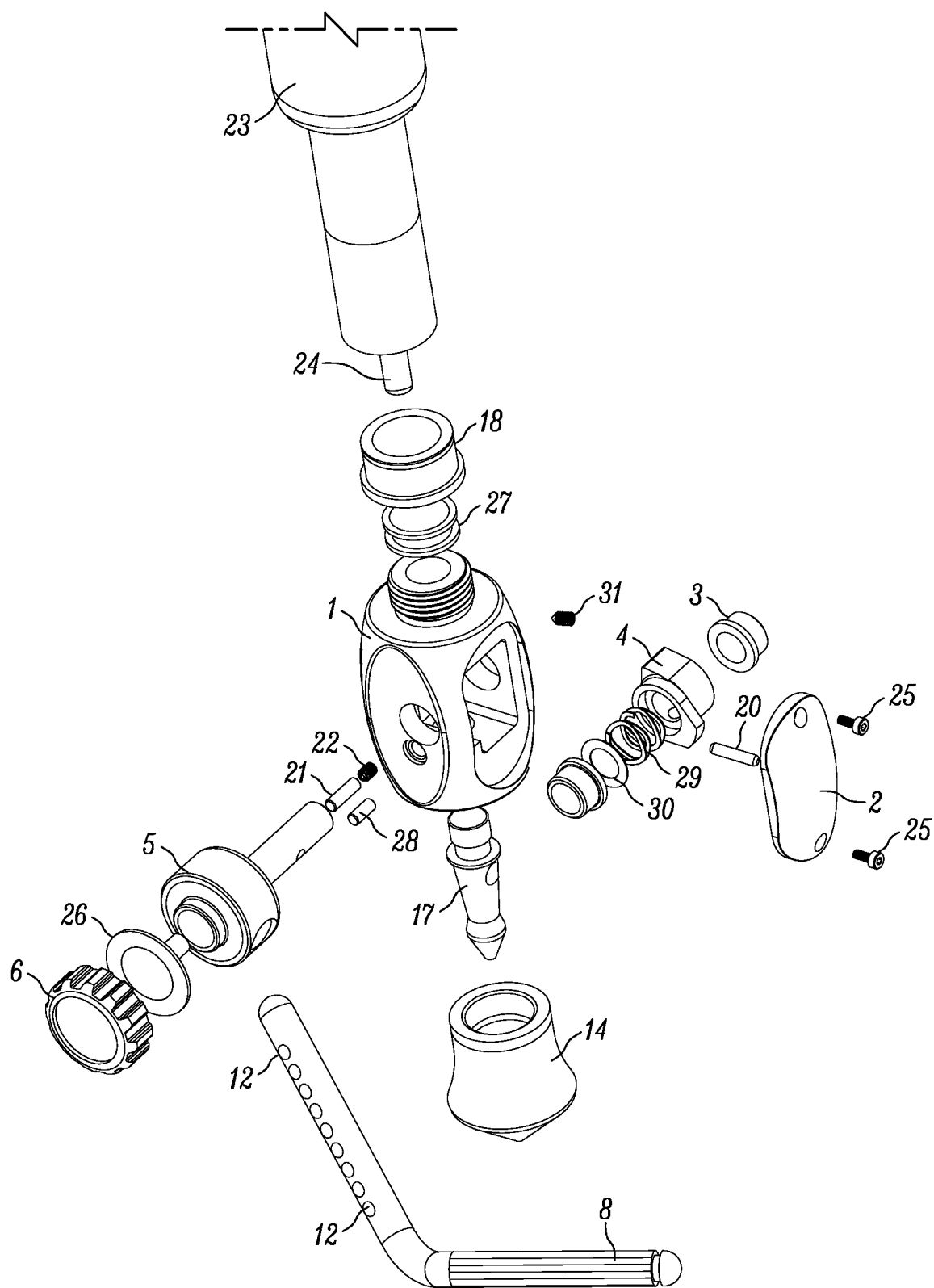
FIG. 6 is a view analogous to FIG. 5, but angularly displaced.

FIGS. 4-6 illustrate the components at the lower end of the monopod. The pedal 8 has an inclined circular rod or rear arm that is mounted in a bore in a shaft member 5. A manual knob 6 and a friction ring 26 are located at one side of the shaft member 5. The shaft member 5 has a shaft that together with a limit pin 21 and an adjusting screw 22 are inserted along a horizontal shaft axis into a passage in the base 1. The limit pin 21 and the adjusting screw 22 bear against a slot 8A (see FIG. 5) on the rear arm of the pedal 8 to limit the travel of the pedal 8. A lock pin 28 is inserted into another passage in the base 1. The shaft of the shaft member 5 is inserted through a friction washer 30, a spring 29, and a cam 4. A pivot bushing 3 is mounted on the base 1 to enable the cam 4 to be turned about the shaft axis. Access to the interior of the base 1 is available by removal of a cover 2 by removing one or more fastener screws 25. A cam locking pin or screw 20 may be included to lock the cam 4 to the shaft member 5 for joint rotation therewith. The foot or base 14 may be used as is, or removed to enable a spike 17 to be staked into the ground. As described below, different feet or bases 14 may replace the foot or base illustrated in FIGS. 4-6 to accommodate different terrains or usage requirements. A bumper 27 and an insert 18 are also mounted on the base 1. A casing 23 of a fluid and/or gas spring extends into the bumper 27 and the insert 18. A release pin 24 at the end of an inner rod or piston of the fluid and/or gas spring extends into the base 1 in the vicinity of the cam 4, whose operation is described below.

Figure 7:
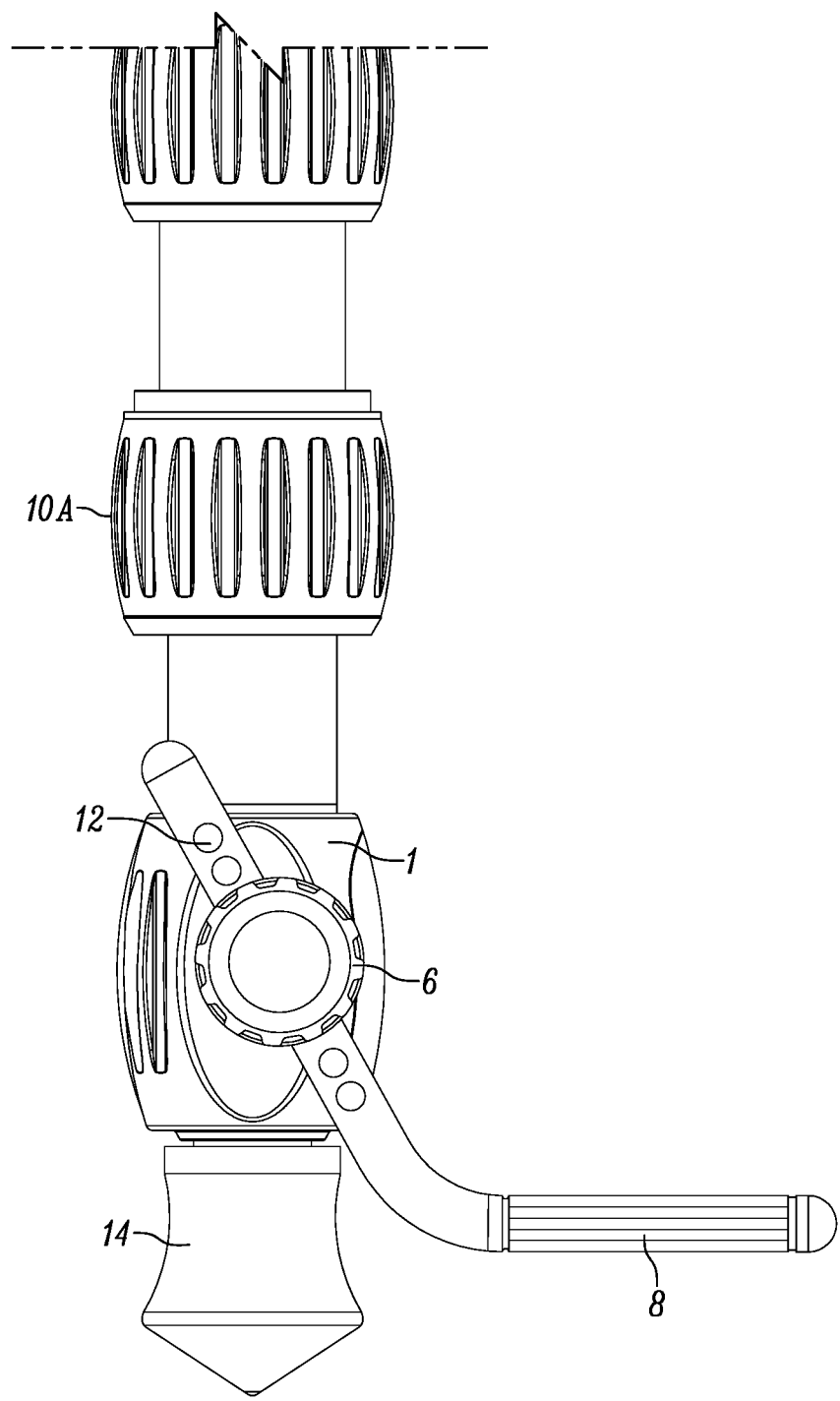
FIG. 7 is a broken-away, front elevational view of the bottom of the monopod, with a foot pedal in a standby position.
Figure 8:
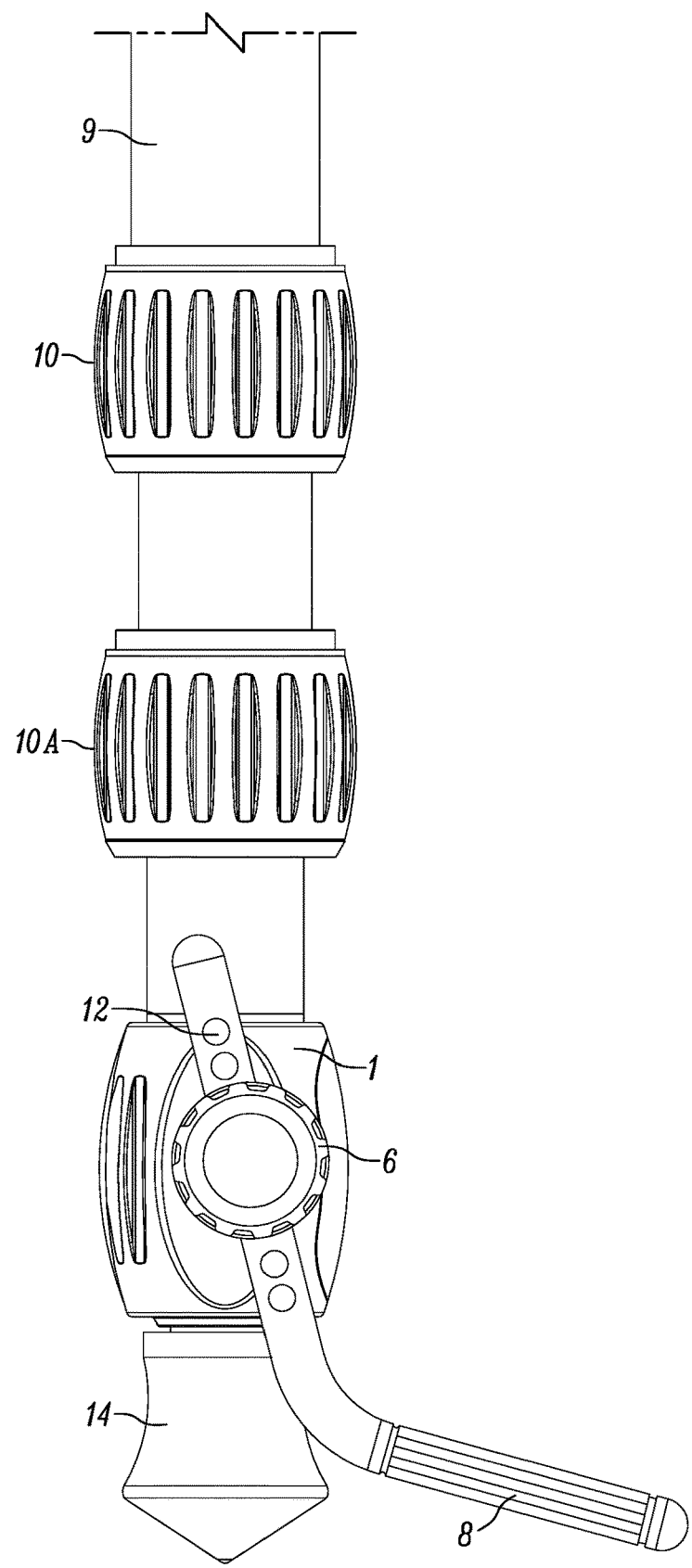
FIG. 8 is a view analogous to FIG. 7, but with the foot pedal in an actuated position.
Figure 9:
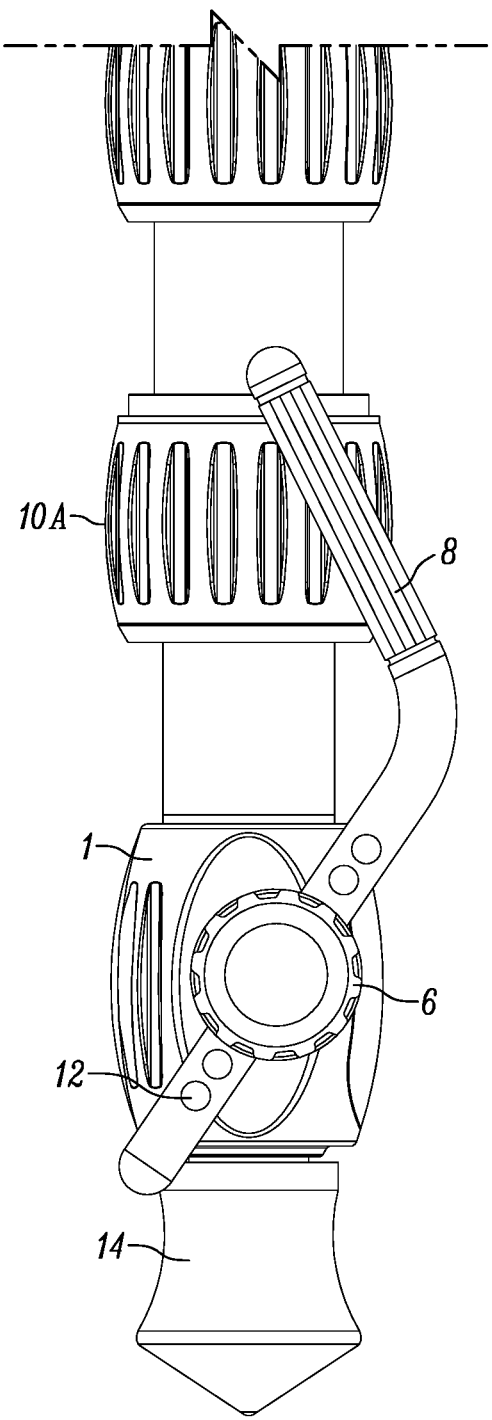
FIG. 9 is a view analogous to FIG. 7, but with the foot pedal in a raised position.
Figure 10:
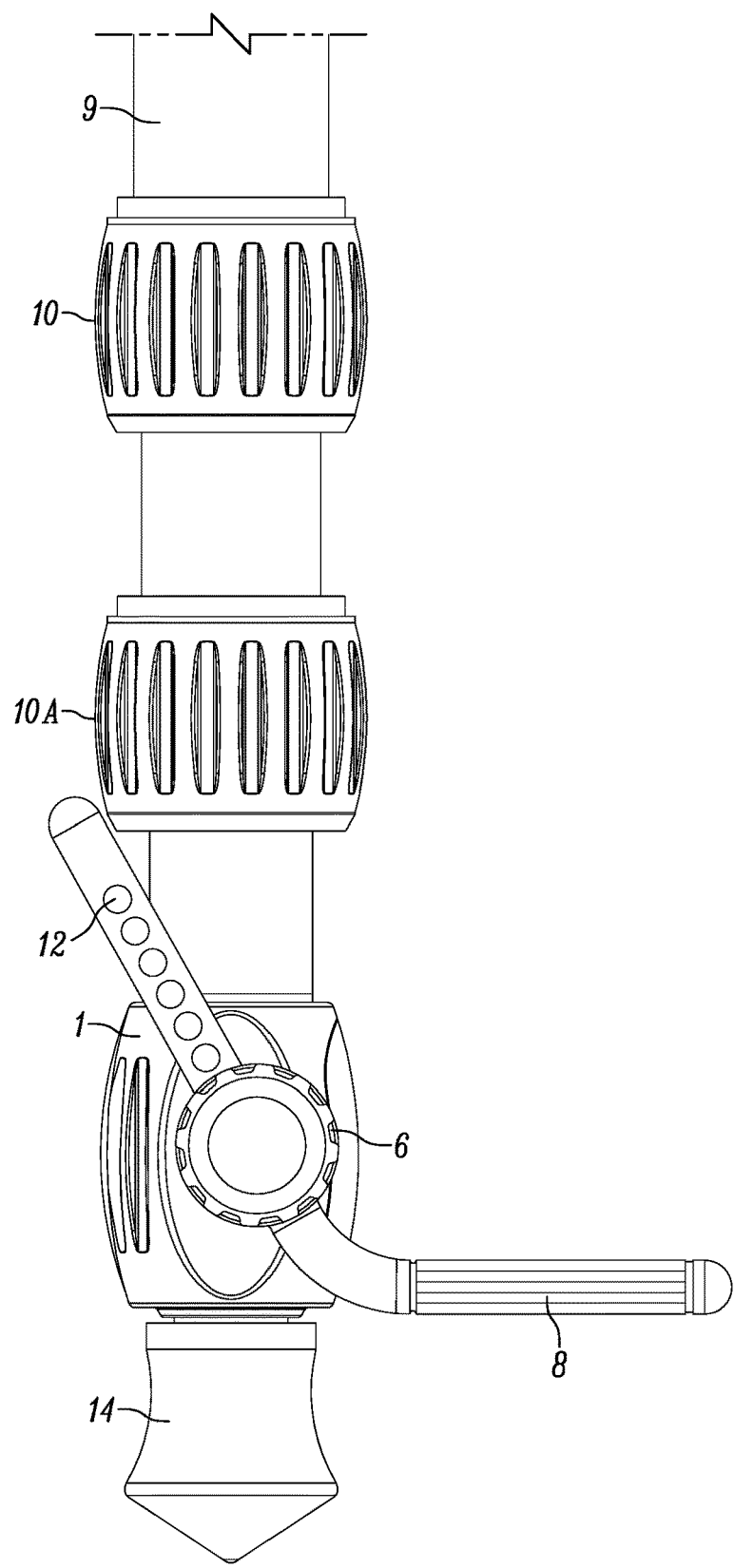
FIG. 10 is a view analogous to FIG. 7, but with the foot pedal in an adjusted position.
Figure 11:
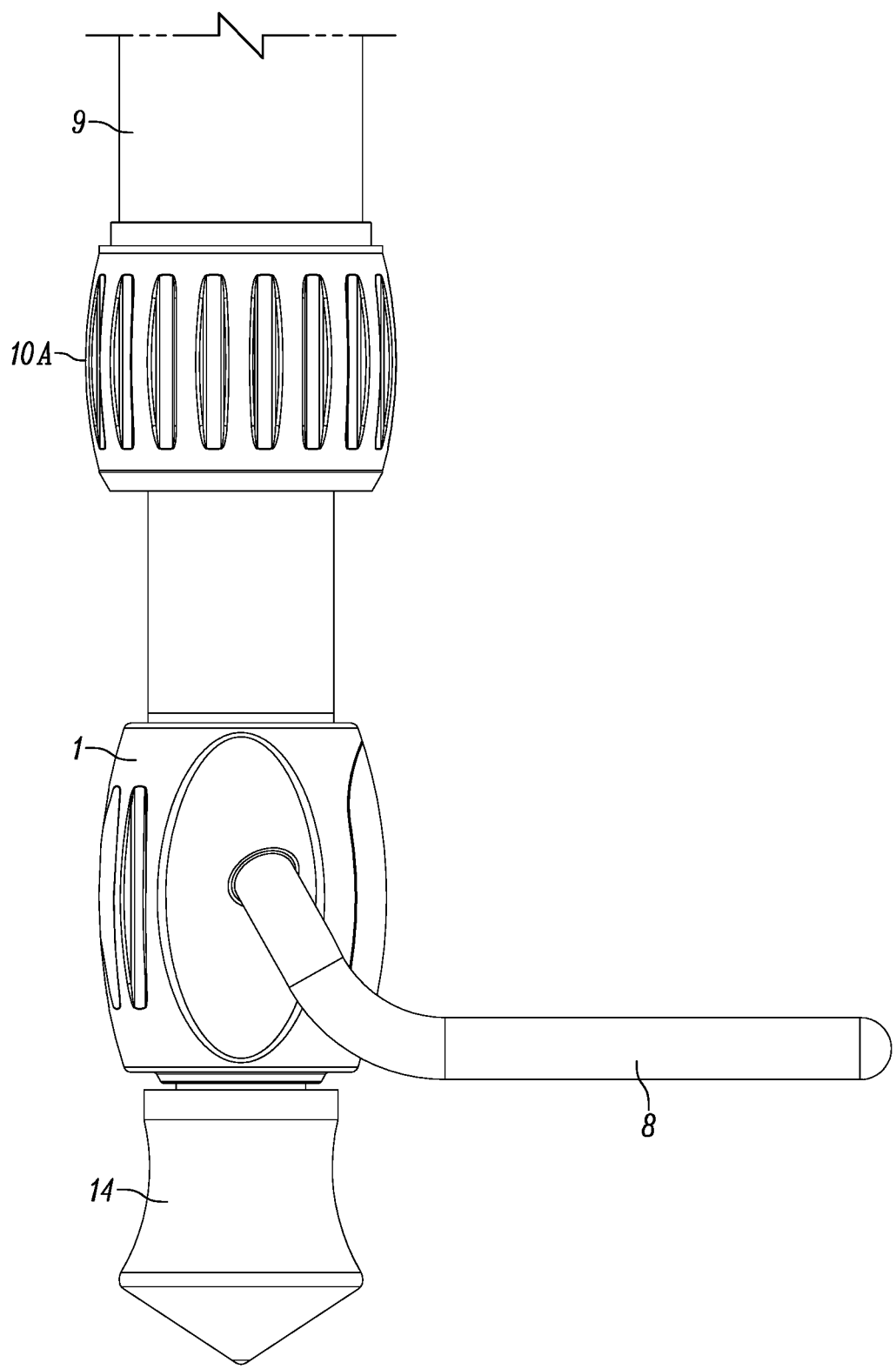
FIG. 11 is a view analogous to FIG. 7, but with the foot pedal in a fixed, standby position, or in a non-adjusted position.
Figure 12:
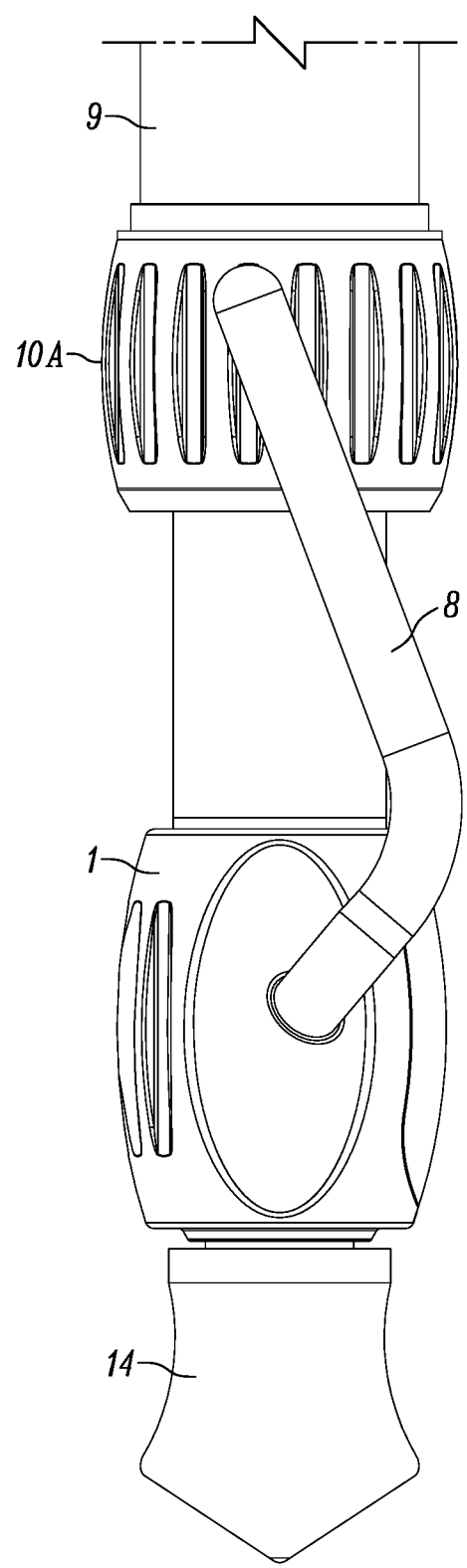
FIG. 12 is a view analogous to FIG. 11, but with the foot pedal in a fixed, raised position.

FIGS. 7-9 illustrate various positions of the foot pedal 8. A front circular rod or front arm of the pedal 8 is in a generally horizontal standby position in FIG. 7, in an actuated or depressed position in FIG. 8, and in a raised or lifted position in FIG. 9. FIG. 9 also illustrates a locked storage position for transport to resist any accidental actuation of the fluid and/or gas spring. In FIG. 10, the pedal 8 is again in the standby position, but at a different elevation relative to the floor. In this embodiment, the pedal 8 is provided with a plurality of spaced-apart mounting indents 12 arranged successively along the rear arm that is inclined relative to the front arm of the pedal 8. Incremental adjustment of the elevation of the pedal is obtained by selection of which mounting indent 12 is used to support the arm. FIGS. 11-12 are analogous to FIGS. 7 and 9, but without the mounting indents 12 and without the adjustment of the elevation of the pedal 8. In a variation, if the limit pin 21 were removed, then the pedal 8 may also be completely removed from the monopod for stowage and/or transport.

Figure 13:
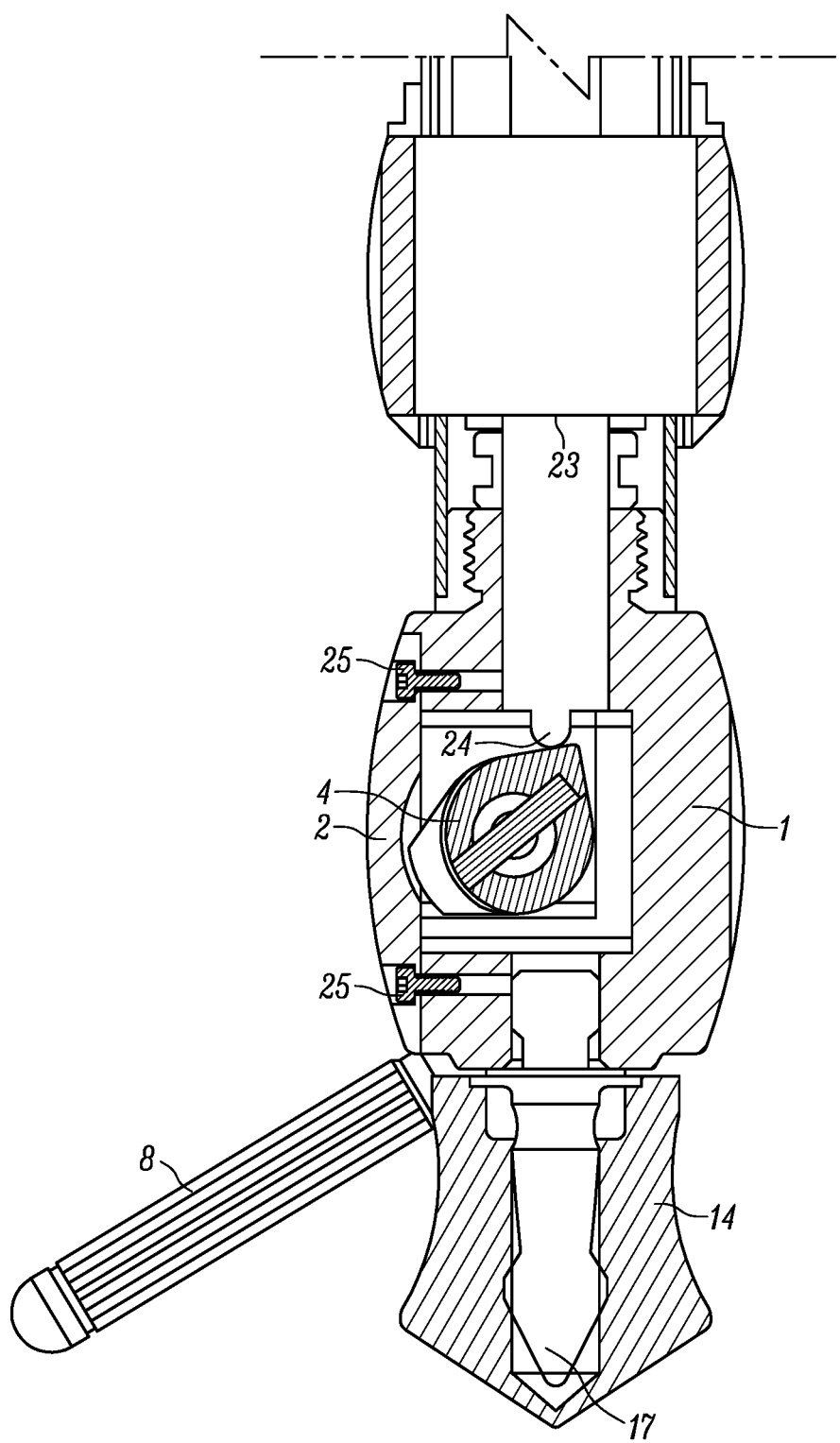
FIG. 13 is a side sectional view analogous to FIG. 8, with the foot pedal in the actuated position.
Figure 14:
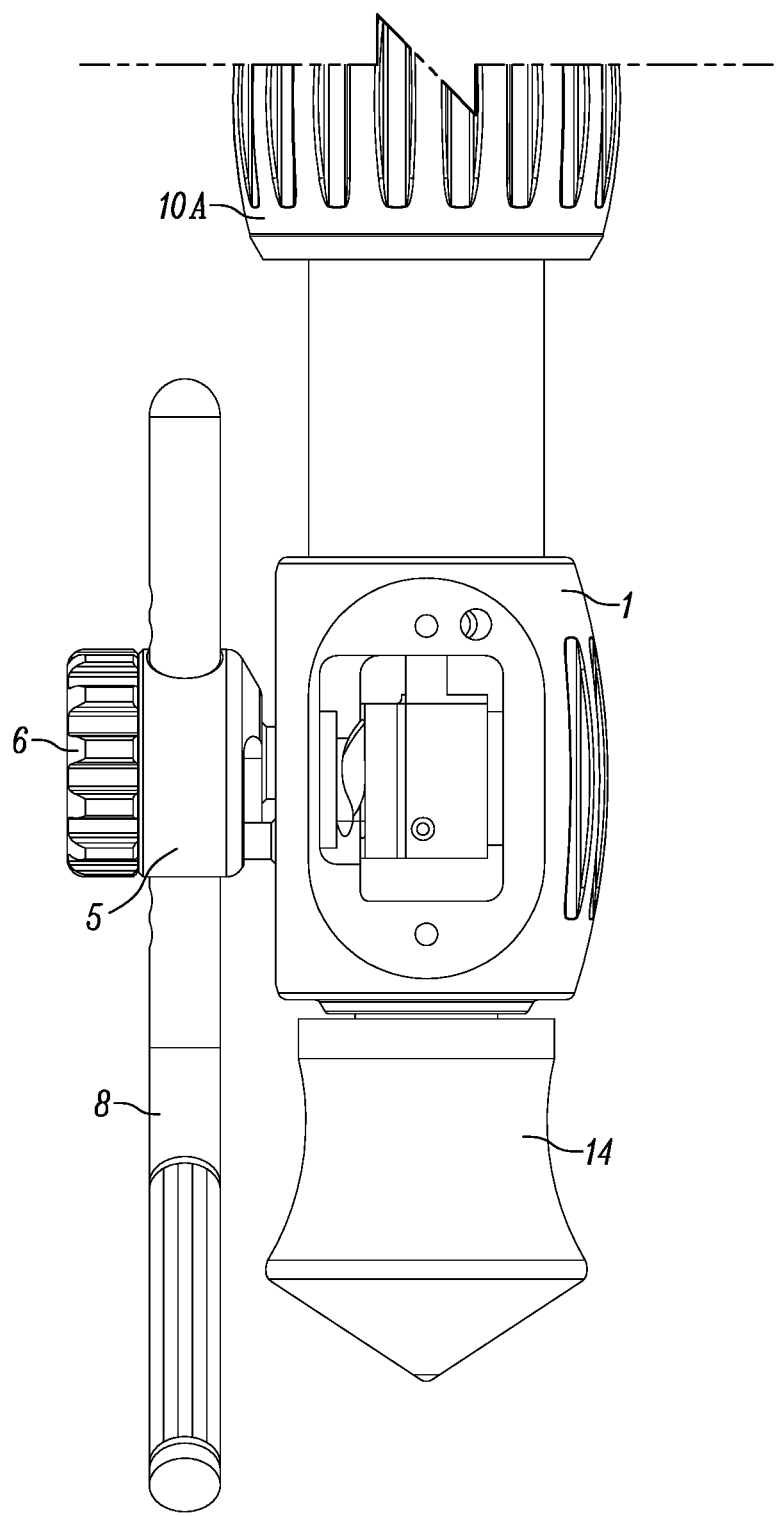
FIG. 14 is an opposite side sectional view analogous to FIG. 13.
Figure 15:
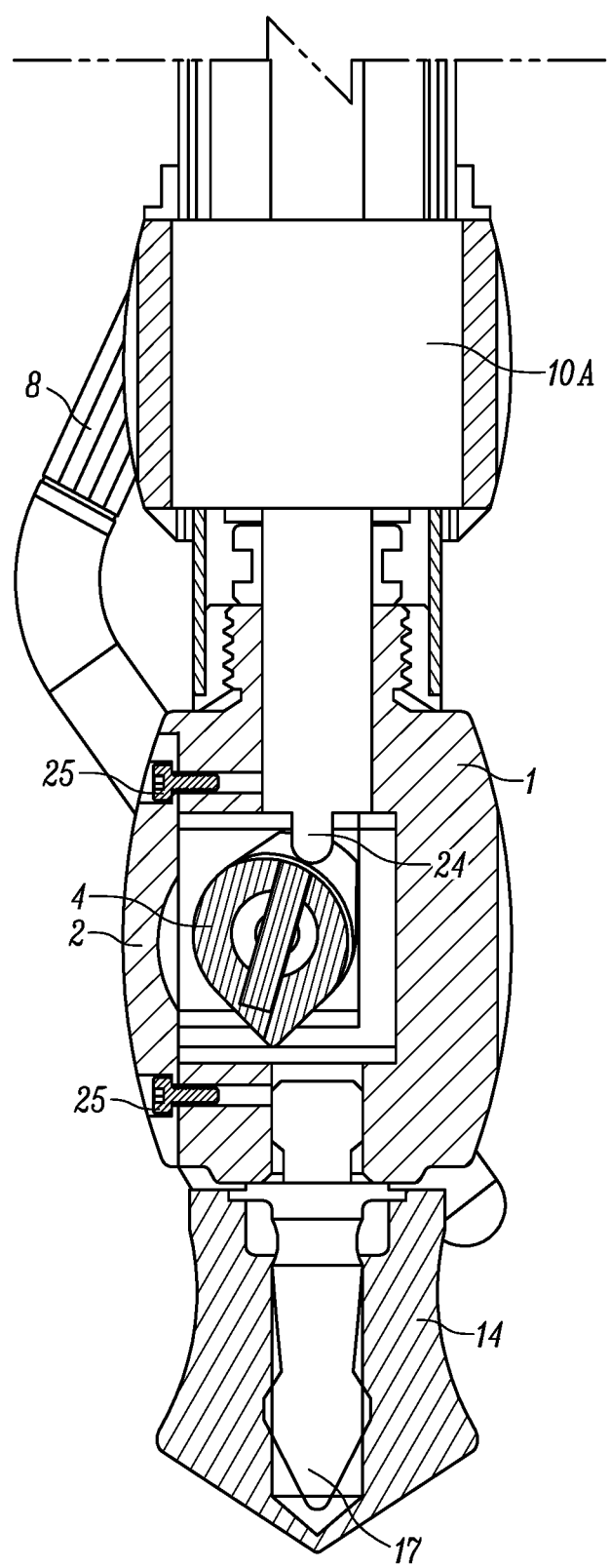
FIG. 15 is a side sectional view analogous to FIG. 9, with the foot pedal in the raised position.
Figure 16:
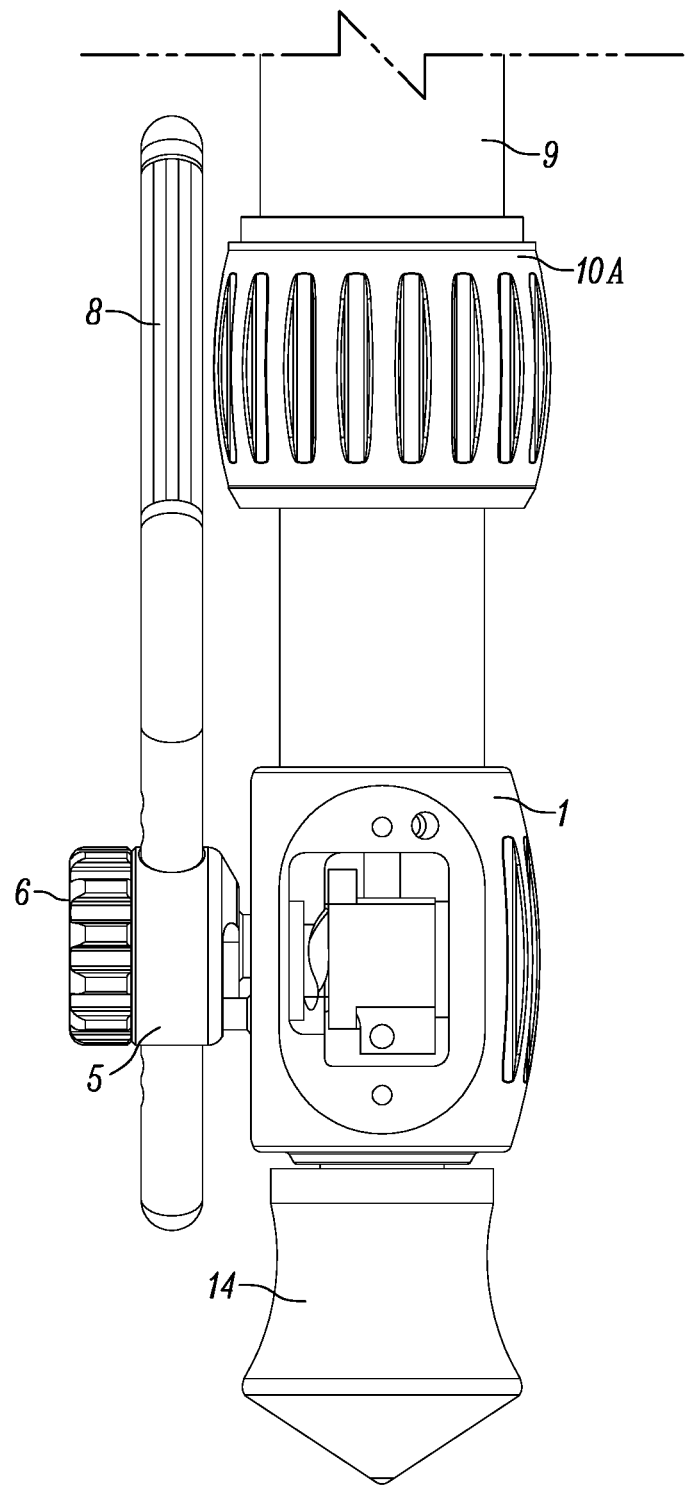
FIG. 16 is an opposite side sectional view analogous to FIG. 15.
Figure 17:
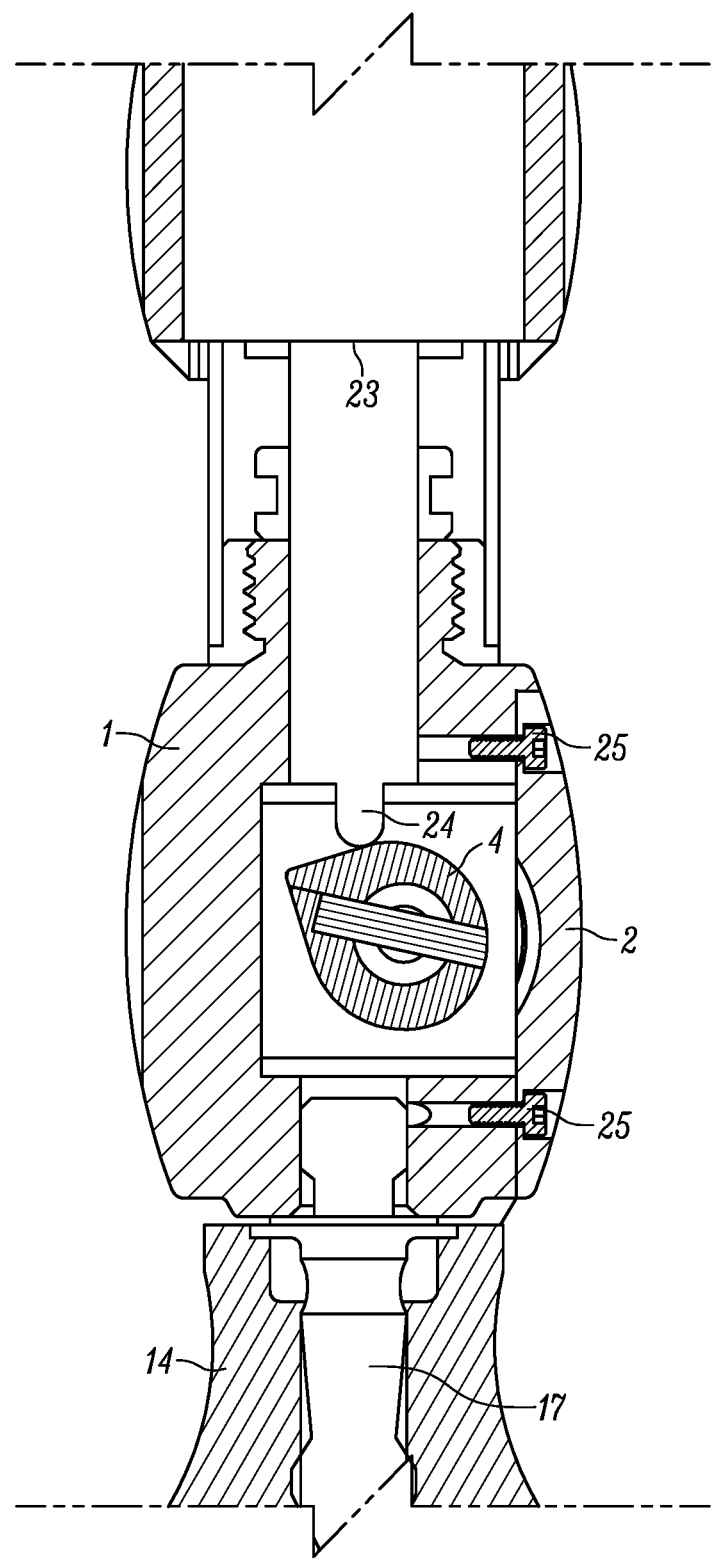
FIG. 17 is an enlarged side sectional view of a detail of FIG. 15.
Figure 18:
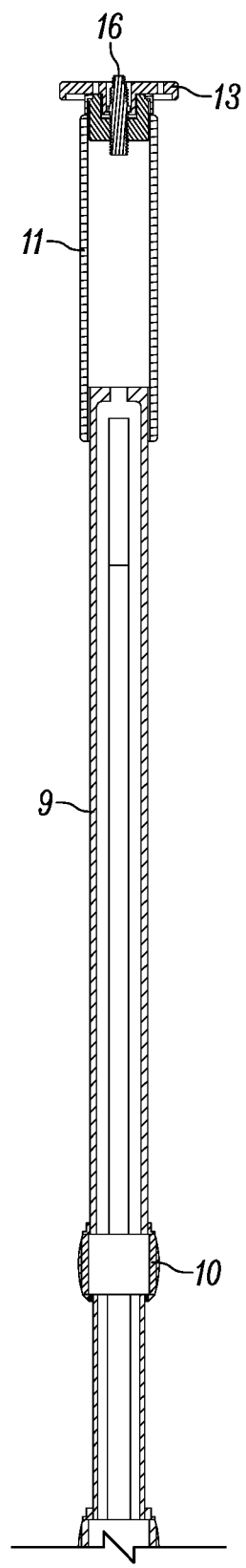
FIG. 18 is an enlarged side sectional view of the top of the monopod.

FIGS. 13-18 illustrate the operation of the monopod. In FIGS. 13-14, the pedal 8 has been actuated, and the cam 4 has been rotated so that the release pin 24 has been engaged and depressed, thereby releasing the pressurized fluid and/or gas within the fluid and/or gas spring. In FIGS. 15-16, the pedal 8 has been raised such that the cam 4 is spaced away from the release pin 24. FIG. 17 is an enlarged view depicting the release pin 24 and the cam 4 in more detail. Once the fluid and/or gas is released, the piston extends upwardly, and the tube(s) 9 are selectively extended to a desired camera height, as shown in FIG. 18. Once pressure on the foot pedal 8 is removed, the actuator locks the monopod at the adjusted elevation, thereby maintaining the desired height for the portable device. Depression of the release pin 24 will allow the gas spring to extend under pressure until the release pin 24 is no longer depressed. If pressure is applied in a downward direction on the head 13 or on the associated attached device while the release pin 24 is depressed, then the gas spring will retract. Once the release pin 24 is again depressed, the retracted or extended position of the inner piston in the gas cylinder will be maintained. Thus, the release pin 24 acts like a spring and will return the foot pedal 8 to the rest position automatically once the force exerted on the pedal 8 has been removed.

Figure 19:
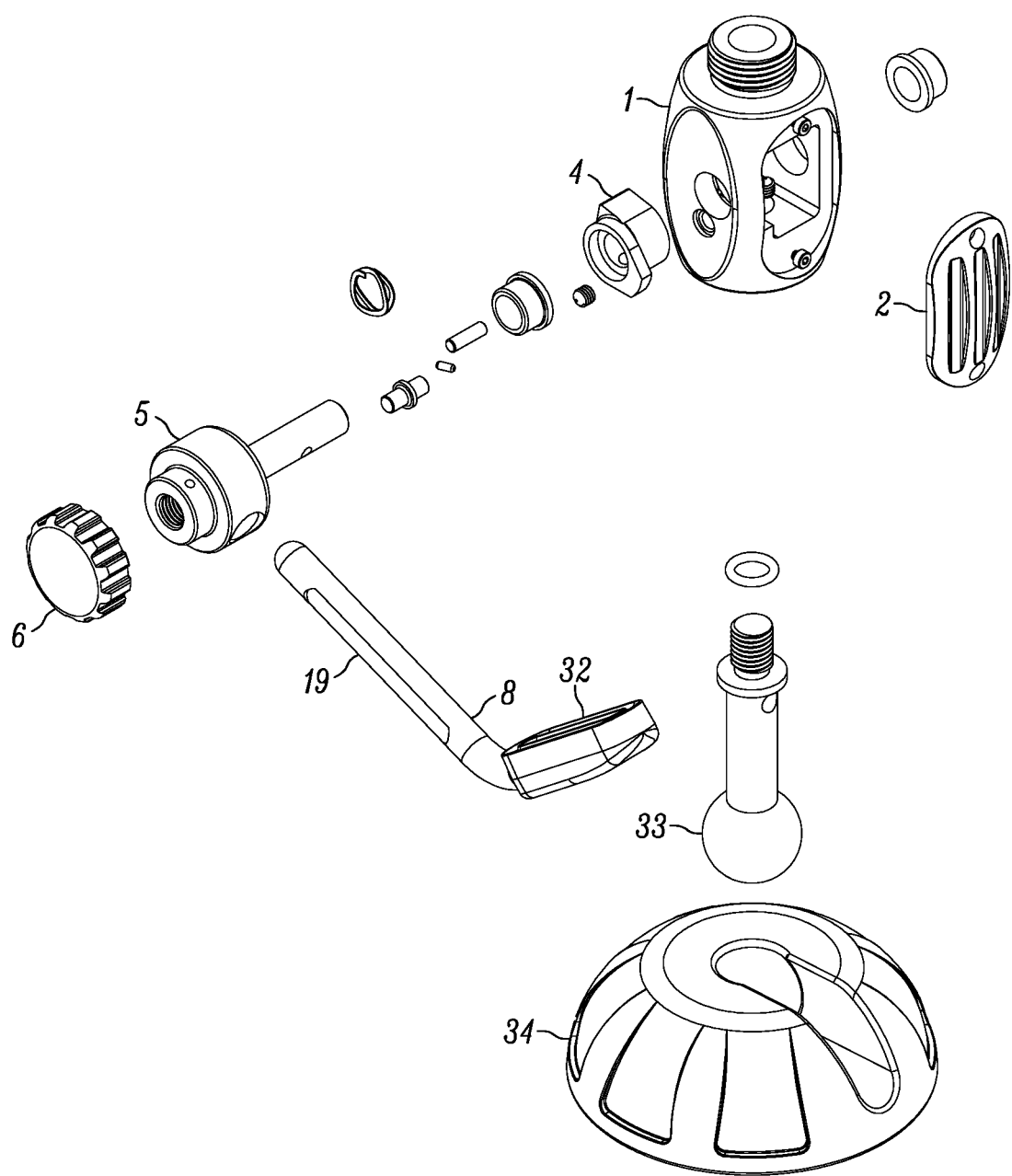
FIG. 19 is an exploded view analogous to FIG. 4, but of a currently preferred embodiment of the monopod.

In a currently preferred embodiment, as shown in FIG. 19, instead of the plurality of mounting indents 12, an elongated flat locking surface 19 is formed along the rear arm of the pedal 8. The shaft member 5 may engage any selected position along the locking surface 19. This permits a linear, continuous adjustment instead of the incremental adjustment afforded by the mounting indents 12. In addition, FIG. 19 depicts a wide, flat, foot pad 32 mounted on the front arm of the pedal 8. The wide pad 32 enables the user to have an improved treading purchase on, and control over, the pedal 8. As mentioned above, FIG. 19 also depicts a different type of footing for the monopod. Instead of the spike 17, a swivel or ball joint 33 is mounted for swiveling movement in a foot 34.

As described, the fluid- and/or gas-powered adjustable monopod is advantageously a camera support device that allows the raising and lowering of a camera by means of a fluid- and/or gas-filled spring that can be released via the foot pedal 8, or other means. This monopod allows hands-free operation for adjusting the camera height either up or down so that various shooting angles can be obtained with little effort. Key features of the monopod include:

1. An adjustable foot pedal height such that the operating position of the pedal 8 can accommodate the use of different height monopod feet, or operator comfort, or terrain, such as snow or mud, where the monopod may have a tendency to sink into the terrain or other support surface.
2. The design can also incorporate a fixed pedal height for operation in more controlled environments.
3. A locking rotational pedal storage position that can be achieved by pulling the pedal pivot shaft member 5 out against a spring force to allow the raising of the pedal 8 to the stowed or raised position, and then releasing it to lock it into a protruding lock pin 28 for storage and/or transport.
4. An inner extension of the fluid and/or gas spring is additionally supported and protected from the ingress of dirt or other matter that may hinder the operation of the monopod. In addition, the outer tube 9 aids in the support of the inner rod or piston of the fluid and/or gas spring.
5. An internal limit pin 21 will help prevent the foot pedal 8 from coming out during use or adjustment.
6. An internal cam 4 activates the fluid and/or gas spring release pin 24 and also serves as a rotational stop to help prevent overrotation of the foot pedal 8 and aids in guiding the user by giving physical feedback when the pedal pivot shaft can be released into the locked or unlocked positions.
7. The monopod can accept different industry standard threaded monopod feet.
8. The foot pedal 8 is removable from the monopod for stowing and/or transport.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions.

The terms "comprises," "comprising," "has," "having," "includes," "including," "contains," "containing," or any other variation thereof, are intended to cover a non-exclusive inclusion, such that a process, method, article, or apparatus that comprises, has, includes, or contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A monopod for supporting a portable camera, comprising:
    an elongated housing extending lengthwise along a longitudinal axis between an upper open end and a lower base for engaging a support surface in use, the housing including a plurality of tubes mounted for telescoping movement along the longitudinal;
    a pneumatic actuator mounted in the housing, and including a cylinder mounted within the housing and bounding a compartment in which a pressurized fluid and/or gas is contained, and an elongated piston having a piston head mounted in the compartment and a piston rod movable along the longitudinal axis through the upper open end of the housing when the pressurized fluid and/or gas is released;
    a support for the portable camera mounted on the piston rod exteriorly of the housing; and
    a foot-operated control mounted on the housing adjacent the base, and movable by pressure exerted by a user's foot from a standby position to an actuated position in which the pressurized fluid and/or gas is released to jointly move the piston rod, at least one of the tubes, and the support along the longitudinal axis to an adjustable elevation relative to the base.

2. The monopod of claim 1, wherein the foot-operated control includes a foot pedal whose elevation relative to the support surface is adjustable in the stand position.

3. The monopod of claim 1, wherein the foot pedal is removably mounted on the housing.

4. The monopod of claim 1, wherein the foot pedal has a front arm on which a foot pad is mounted.

5. The monopod of claim 1, wherein the pneumatic actuator has a release pin, and further comprising a cam member jointly movable with the foot-operated control, and wherein the cam member engages and depresses the release pin when the foot-operated control has been moved to the actuated position.

6. The monopod of claim 1, wherein the foot-operated control is movable in one circumferential direction from the standby position to the actuated position, and is movable in an opposite circumferential direction from the standby position to a raised stowed position.

7. The monopod of claim 1, wherein the support includes a mounting element for fixedly securing the camera thereon.

8. The monopod of claim 1, and a plurality of tube clamps for locking the tubes against undesired telescoping movement along the longitudinal axis.

9. The monopod of claim 1, wherein the base includes a foot selected from a plurality of different feet.

10. The monopod of claim 1, and further comprising a wrist strap connected to the housing.

11. The monopod of claim 2, wherein the foot pedal has a rear arm along which a plurality of mounting indents are spaced apart, and further comprising a shaft member mounted on the base and engaging a selected one of the mounting indents in the standby position.

12. The monopod of claim 2, wherein the foot pedal has a rear arm along which an elongated locking surface is formed, and further comprising a shaft member mounted on the base and lockingly engaging a selected position along the locking surface in the standby position.

13. The monopod of claim 5, wherein the base bounds a hollow compartment, and wherein the release pin and the cam member are mounted within the compartment to resist contaminants from reaching the release pin and the cam member.

* * * * *